United States Patent [19]
Blake

[11] 3,914,328
[45] Oct. 21, 1975

[54] CATALYST REGENERATION

[75] Inventor: Robert Joseph Blake, Oakland, Calif.

[73] Assignee: Stauffer Chemical Company, Westport, Conn.

[22] Filed: Oct. 9, 1973

[21] Appl. No.: 404,441

Related U.S. Application Data

[63] Continuation of Ser. No. 144,403, May 17, 1971, abandoned.

[52] U.S. Cl............ 260/659 A; 252/415; 260/654 A; 260/656 R; 260/658 R; 260/662 A; 252/411 S
[51] Int. Cl.²........................................... B01D 15/06
[58] Field of Search........ 260/659 A, 662 A, 656 R, 260/654 A, 658 R; 252/415, 411 S

[56] References Cited
UNITED STATES PATENTS

| | | | |
|---|---|---|---|
| 3,427,359 | 2/1969 | Rectenwald et al. | 260/659 A |
| 3,692,693 | 9/1972 | Gunning et al. | 252/411 S |

FOREIGN PATENTS OR APPLICATIONS 1,007,077  10/1965  United Kingdom............. 260/654 A Primary Examiner—Delbert E. Gantz
Assistant Examiner—Joseph A. Boska
Attorney, Agent, or Firm—Michael J. Bradley

[57] ABSTRACT

The active life of a specified oxychlorination catalyst is extended by the removal of sulfur-containing compounds from the surface of the catalyst. More particularly, a copper containing oxychlorination catalyst which has been deactivated by the deposition of sulfur compounds thereon is reactivated in situ by operating the catalyst bed at a temperature of at least about 600°C. for a sufficient period of time, while maintaining the flow of reactants. The reactivation of the catalyst is completed when the conversions of hydrocarbon and chlorinating agent to chlorinated products indicates a high level of catalyst activity, as determined by an analysis of the gaseous effluent leaving the catalyst bed.

6 Claims, No Drawings

CATALYST REGENERATION

This is a continuation of application Ser. No. 144,403, filed May 17, 1971, now abandoned.

BACKGROUND OF THE INVENTION

This invention relates to the extension of the active life and reactivation of a specified copper containing oxychlorination catalyst, and more specifically, to the extension of the active life and reactivation of such catalyst while being used in an oxychlorination process, particularly the oxychlorination of methane.

The oxychlorination of hydrocarbon materials with a chlorinating agent and an oxygen containing gas is a well known process. Suitable known catalysts are employed which accelerate the oxychlorination reaction. One well known catalytic system for the oxychlorination of hydrocarbons, particularly the oxychlorination of methane, is that disclosed in U.S. Pat. No. 3,210,431, British Pat. No. 1,054,750 (1967), and U.S. Pat. No. 3,427,359. The catalyst comprises a mixture of copper chloride, one or more alkali metal and/or alkaline earth metal chlorides, and one or more rare earth chlorides and/or oxides, all in specified percentages by weight, deposited on a carrier or support, particularly a low surface area support. The preferred support has a surface area of from about 1 to about 50 square meters per gram. Although an effective catalyst, this system suffers from the deficiency that the catalyst becomes poisoned by impurities, particularly sulfur impurities, which enter the oxychlorination reaction zone with the feed stream. Replacement of the catalyst is expensive and can require costly down time.

SUMMARY OF THE INVENTION

A method is therefore provided for the in situ reactivation of a catalyst, for the oxychlorination of hydrocarbons having 1 through 4 carbon atoms and certain chlorinated derivatives thereof, which is a mixture of copper chloride, one or more alkali metal and/or alkaline earth metal chlorides and one or more rare earth chlorides and/or oxides, deposited on a carrier or support, especially a low surface area support, which have been deactivated by the deposition of sulfur containing compounds or impurities. More particularly, the invention comprises a method for the regeneration of a deactivated oxychlorination catalyst employed in a process for the oxychlorination of hydrocarbons, without shutting down the oxychlorination process, the catalyst having a composition comprising a mixture of from about 1 to about 15 per cent by weight copper chloride, from about 1 to about 15 per cent by weight alkali metal chloride, and from about 0.5 to 18 per cent by weight rare earth metal chloride, or mixtures of rare earth metal chlorides, deposited on a support having a surface area of from about 1 to about 50 square meters per gram, comprising raising the temperature employed in the process to at least about 585°C., while maintaining the flow of the reactants, for a period of time sufficient to reactivate the catalyst. The method is particularly adapted to the regeneration of a preferred catalyst of this type, which contains from about 0.5 per cent to about 15 per cent $CuCl_2$, from about 0.1 per cent to about 10 per cent of an alkali metal chloride selected from the group consisting of KCl and NaCl; from about 0.1 per cent to about 12 per cent didymium chloride; and from about 0.2 per cent to about 6 per cent $LaCl_3$, deposited on a support having a surface area of from about 1 to about 30 square meters per gram, all weights being based on the total weight of the catalyst actives plus the support media.

The term hydrocarbon having from 1 to 4 carbon atoms and certain chlorinated derivatives thereof includes, for example, alkanes containing 1 through 4 carbon atoms, such as methane, ethane, propane, and butane, alkenes, such as ethylene, propylene, and butylene, and chlorinated derivatives such as methyl chloride, methylene chloride, trichloromethane, and ethylene dichloride. This method appears applicable regardless of the level of sulfur containing impurities in the feed gases to the oxychlorination reaction zone.

In accordance with the invention, when the deposition of sulfur containing compounds on the copper containing catalyst has deactivated the catalyst to a point where operation is no longer considered economical, the temperature of the system is raised to at least about 585°C. while maintaining the flow of the reactants to the oxychlorination reaction zone. Generally, the in situ reactivation method is carried out in an oxychlorination reaction zone maintained between about 585°C. and about 1000°C. (preferably about 600°C. to about 900°C.) and a pressure between about 1 atmosphere and about 100 to 150 atmospheres. This procedure is continued for a period of time sufficient to remove the deposited sulfur material and reactivate the catalyst, as for example, from one-half hour to 2 or 3 hours or longer, and then the oxychlorination process is continued.

Deactivation of the catalyst is considered to take place when the deposition of the sulfur containing compounds on the catalyst reaches such a level that an analysis of the gaseous effluent leaving the oxychlorination reaction zone shows that there is a substantial reduction in the per cent of the chlorinating agent which is being consumed in the oxychlorination zone. The continued deposition of sulfur causes the rapid deactivation of the catalyst once the total sulfur content reaches a minimum level in the bed. This level appears to be between about 2 per cent and about 10 per cent by weight where the sulfur content is expressed as sulfate. The sulfur level at which the particular catalyst is deactivated appears dependent on the total salt loading of the catalyst. As indicated, reactivation of the copper containing catalyst is determined by a comparison of the activity of the uncontaminated catalyst when first used in the oxychlorination reaction zone with the activity of the catalyst after it has been subjected to the high temperature treatment. When the activities are about equal the copper containing catalyst is considered to have been reactivated. For a given catalyst this can be determined empirically and the high temperature treatment may be regulated accordingly. In general, in a given oxychlorination process, such as the oxychlorination of methane, an analysis of the gaseous effluent which shows a low conversion of hydrogen chloride and a low conversion of methane to chlorinated methanes and a concomitant high yield of carbon oxides indicates deactivation of the catalyst. Conversely, suitable catalyst reactivation in a methane oxychlorination reaction zone is indicated by analysis showing a high conversion of hydrogen chloride and a high conversion of methane to chlorinated methanes with a low yield of carbon oxides. Determination of catalyst deactivation and reactivation can also be based on an analysis of the sulfur content of the catalyst bed. As indicated, the sulfur content of the catalyst, expressed as the sulfate, should be reduced to below 2 per cent, and preferably below one per cent by weight. For a particular oxychlorination reaction, the deactivation and reactivation of the copper containing catalyst is dependent upon factors such as the lowest per cent conversion of reactants to products under which the oxychlorination reaction can be operated economically.

Generally, oxychlorination reaction conditions suitable for use in conjunction with the method of the present invention are well known in the prior art, such as the oxychlorination reaction conditions for methane as disclosed in U.S. Pat. No. 3,267,160, U.S. Pat. No. 3,190,931, and U.S. Pat. No. 3,173,962.

Normally, the reaction involves a catalyzed process in whch gaseous chlorine, hydrogen chloride, carbon tetrachloride or a mixture of two or more of these materials, is used as a chlorinating agent. The process further involves chlorination of methane with the chlorinating agent at a temperature of from about 350°C. to about 550°C. and in the presence of an oxygen containing gas such as air, elemental oxygen, or air enriched with oxygen. In most processes for the oxychlorination of methane, the ratio of chlorinating agent to methane ranges from about 0.5 mol to about 5.0 mols chlorinating agent per mol of methane, while the oxygen containing gas is supplied in a ratio of about 0.2 mol to about 2.5 mols of oxygen per mol of chlorinating agent. In general, the methane oxychlorination reaction zone is operated at pressures of between about 1 atmosphere and about 150 atmospheres and preferably between about 1 atmosphere and about 100 atmospheres. As indicated, the process takes place preferably in the presence of a cupric chloride catalyst. It has been postulated that in these oxychlorination processes, the hydrogen chloride is oxidized to chlorine and water, and the chlorine reacts with the methane to form chlorinated methanes. Preferably, this reaction is carried out in a fluidized bed system. The effluent from the reactor which contains the chlorinated methanes, i.e., methyl chloride, methylene chloride, trichloromethane (chloroform), and carbon tetrachloride, is then passed through known recovery steps. One reason for the generally low range of temperatures employed is that the copper chloride in the catalyst is subject to some extent to volatilization. The discovery that this catalyst can be reactivated at temperatures about 585°C. and above is therefore all the more surprising since it might be expected that extreme volatilization of the catalyst would occur.

EXAMPLE I

Methane, HCl, and oxygen (as air) are combined in a reactor in a ratio of 1:1:0.74 at a temperature of about 440°C. and a pressure of about 1 atmosphere in the presence of a fluidized catalyst having a composition by weight of about 2.5 per cent Cu, 1.54 per cent potassium; 5.0 per cent didymium, and 1.3 per cent La, all as the metals, based on the weight of the actives and the support. The actives are deposited as the chlorides on an α-alumina support having a surface area of 12 square meters per gram. After about 2836 hours, the bed temperature is raised to about 593°C., while maintaining the flow of the reactants. About 4 hours later, the temperature of the bed is lowered to 440°C. Analysis indicates substantially reduced sulfur levels on the catalyst.

I claim:
1. In a catalytic process for the oxychlorination of hydrocarbons having 1 through 4 carbon atoms and chlorinated derivatives thereof characterized by extended catalyst life, wherein the catalyst employed has a composition comprising a mixture of from about 1 to about 15 per cent by weight copper chloride, from about 1 to about 15 per cent by weight alkali metal chloride, and from about 0.5 to 18 per cent by weight rare earth metal chloride, or mixtures of rare earth metal chlorides, deposited on a support having a low surface area comprising, contacting the hydrocarbon and chlorinated derivatives thereof having sulfur containing impurities therein, a chlorinating agent, and an oxygen containing gas in a reactor at a temperature of from about 350°C. to about 550°C., at a pressure of about 1 atmosphere or greater, and in the presence of said catalyst, until the catalyst has become deactivated with at least 2 per cent by weight of sulfur containing compounds where the sulfur is expressed as the sulfate, the improvement comprising raising the temperature employed in the reactor to at least about 585°C. for a time sufficient to activate the catalyst by removal of the sulfur containing compounds, while maintaining the flow of reactants to the reactor, and thereafter lowering the temperature to a temperature of from about 340°C. to about 550°C. and continuing the contacting of the hydrocarbon, chlorinating agent, and oxygenating agent.

2. The improved process of claim 1 wherein the oxychlorinated hydrocarbon and chlorinated derivatives thereof contain 1 carbon atom.

3. The improved process of claim 2 wherein the catalyst comprises, by weight, from about 0.5 per cent to about 15 per cent $CuCl_2$, from about 0.1 per cent to about 10 per cent of an alkali metal chloride selected from the group consisting of KCl and NaCl, from about 0.1 per cent to about 12 per cent didymium chloride, and from about 0.2 per cent to about 6 per cent $LaCl_3$, deposited on a support having a surface area of from about 1 to about 30 square meters per gram.

4. A method for the regeneration of an oxychlorination catalyst employed in a process for the oxychlorination of hydrocarbon containing 1 through 4 carbon atoms and chlorinated derivatives thereof having sulfur containing impurities therein, at a temperature of from about 350°C. to about 550°C. the catalyst having a composition comprising a mixture of from about 1 to about 15 per cent by weight copper chloride from about 1 to about 15 per cent by weight alkali metal chloride, and from about 0.5 to 18 per cent by weight of a rare earth metal chloride, or mixture of rare earth metal chloride deposited on a support having a low surface area, the catalyst having been deactivated by deposition thereon of at least 2 per cent by weight of sulfur containing compounds where the sulfur is expressed as sulfate, comprising raising the temperature employed in the process to at least about 585°C., while maintaining the flow of the reactants, for a period of time sufficient to reactivate the catalyst by removal of the sulfur containing compounds.

5. The method of claim 4 wherein the oxychlorinated hydrocarbon and chlorinated derivatives thereof contain 1 carbon atom.

6. The method of claim 5 wherein the catalyst comprises, by weight, from about 0.5 per cent to about 15 per cent $CuCl_2$, from about 0.1 per cent to about 10 per cent of an alkali metal chloride selected from the group consisting of KCl and NaCl, from about 0.1 per cent to about 12 per cent didymium chloride, and from about 0.2 per cent to about 6 per cent $LaCl_3$, deposited on a support having a surface area of from about 1 to about 30 square meters per gram.

* * * * *